United States Patent [19]

Yoshioka et al.

[11] Patent Number: 4,791,714
[45] Date of Patent: Dec. 20, 1988

[54] PROCESS FOR ASSEMBLING A FLY WHEEL AND AN IGNITION COIL TO AN ENGINE USING AN ASSEMBLING JIG

[75] Inventors: Teruo Yoshioka; Shoji Nakano; Yutaka Sato, all of Sayama, Japan

[73] Assignee: Honda Giken Kogyo Kabushiki Kaisha, Tokyo, Japan

[21] Appl. No.: 75,469

[22] Filed: Jul. 20, 1987

[30] Foreign Application Priority Data

Jul. 21, 1986 [JP] Japan ................. 61-169777
Jul. 21, 1986 [JP] Japan ................. 61-169778

[51] Int. Cl.$^4$ .............................. B23P 15/00
[52] U.S. Cl. ..................... 29/156.4 R; 123/647
[58] Field of Search ............ 29/156.4 R, 701; 123/647, 635, 149 D

[56] References Cited

U.S. PATENT DOCUMENTS 4,146,806  3/1979  Katsumata ............... 123/149 D X
4,270,509  6/1981  Tharman ................... 123/647

FOREIGN PATENT DOCUMENTS 58-82635  5/1983  Japan .

Primary Examiner—Timothy V. Eley
Assistant Examiner—Frances Chin
Attorney, Agent, or Firm—Armstrong, Nikaido, Marmelstein & Kubovcik

[57] ABSTRACT

The fly wheel and the ignition coil are set on the set jig with a comparatively large space left therebetween so that the two do not adhere to each other during the placement thereof. After the fly wheel and the ignition coil are placed on the set jig and are delivered to the two holding means of the assembling jig, a large space is maintained between the fly wheel and the ignition coil so that when the fly wheel is turned to be aligned, there is no magnetic force acting between the fly wheel and the ignition coil. Thus, the fly wheel can be easily assembled to the crankshaft. Thereafter, the ignition coil is brought to approach the fly wheel and is assembled to the engine main body where it is located at its normal facing position in relation to the fly wheel.

1 Claim, 9 Drawing Sheets

PROCESS FOR ASSEMBLING A FLY WHEEL AND AN IGNITION COIL TO AN ENGINE USING AN ASSEMBLING JIG

FIELD OF THE INVENTION

This invention relates to an assembling process for automatically assembling a fly wheel to an end portion of a crankshaft of an engine, and for automatically assembling an ignition coil to an engine main body so as to face a circumferential surface of the fly wheel.

BACKGROUND OF THE INVENTION

A previous process of this kind uses a first set jig and a first assembling jig for a fly wheel, and a second set jig and a second assembling jig for an ignition coil. Firstly, a fly wheel on the first set jig is assembled to an end portion of a crankshaft by the first assembling jig. Then, an ignition coil on the second set jig is assembled to an engine main body by the second assembling jig.

The forgoing process is inconvenient, however, since it requires the installation of two sets of set jigs and assembling jigs for the fly wheel and for the ignition coil. Thus, the installation is expensive.

Another process of this kind has the fly wheel and the ignition coil set on a single set jig in order to have the same positional relationship as actually assembled to an engine. Assembling the fly wheel and the ignition coil is carried out by a single assembling jig having respective holding means for the fly wheel and the ignition coil. In this type, however, the fly wheel and the ignition coil are attracted to one another by the magnetic force of a magnet attached to the fly wheel. When the fly wheel and the ignition coil are being set on the set jig, the two are likely to adhere together due to the magnetic force. Thus, the setting operation is troublesome. Additionally, a problem arises when the fly wheel, after being delivered to the assembly jig, is turned relatively to the ignition coil until it is so aligned in phase with the ignition coil that is brought into key engagement with the crankshaft. However, the turning of the fly wheel is obstructed by the magnetic force acting between the fly wheel and the ignition coil.

This invention provides a process which removes the foregoing problems and makes it possible to assemble a fly wheel and an ignition coil by a single set jig and a single assembling jig.

SUMMARY OF THE INVENTION

According to this invention, for achieving the foregoing object, the foregoing process has a fly wheel and an ignition coil set on a set jig with a comparatively large space left therebetween so that the two are not attracted to one another by a magnetic force. An assembling jig has two sliding means for the fly wheel and for the ignition coil. The assembling jig is moved to a delivering position where the set jig is fixedly placed. The fly wheel and the ignition coil set on the set jig are delivered to the two holding means under the condition that the space left therebetween is maintained. Then, each assembling jig is moved to an assembling position where an engine is fixedly placed in position. The fly wheel is first assembled to an end portion of a crankshaft. Then, the ignition coil is brought to approach the fly wheel and is assembled to an engine main body located at its normal facing position in relation to the fly wheel.

DESCRIPTION OF THE PREFERRED EMBODIMENT

Figure 16:
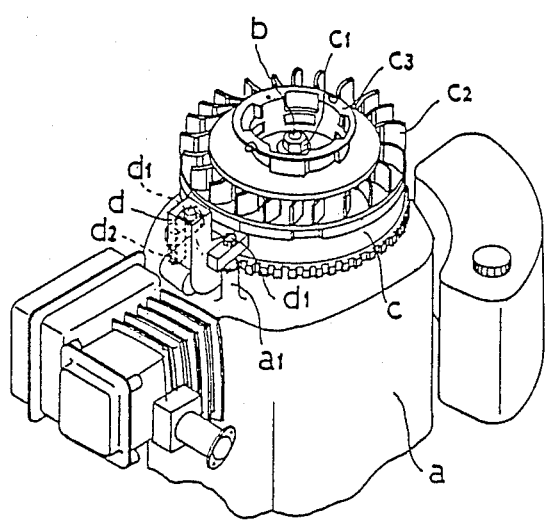
FIG. 16 is a perspective view showing a fly wheel and an ignition coil assembled to an engine.

Next, the invention will be explained hereinafter with reference to an assembly as shown in FIG. 16.

A fly wheel c is fastened with a nut c1 to an end portion of a crankshaft b projecting from an outer surface of an engine main body a of a general purpose engine. A fan c2 and a starter pulley c3 are placed one on top of another. An ignition coil d, serving as an ignition electric source, is fastened with a pair of bolts d1, d1, to a boss section a1 on an other surface of the engine main body a when the ignition coil d faces a circumferential surface of the fly wheel c, with a predetermined space (1 mm, for instance,) left therebetween. Additionally, a cord clamper d2 is fastened to the boss section together with the ignition coil d.

Figures 1, 2:
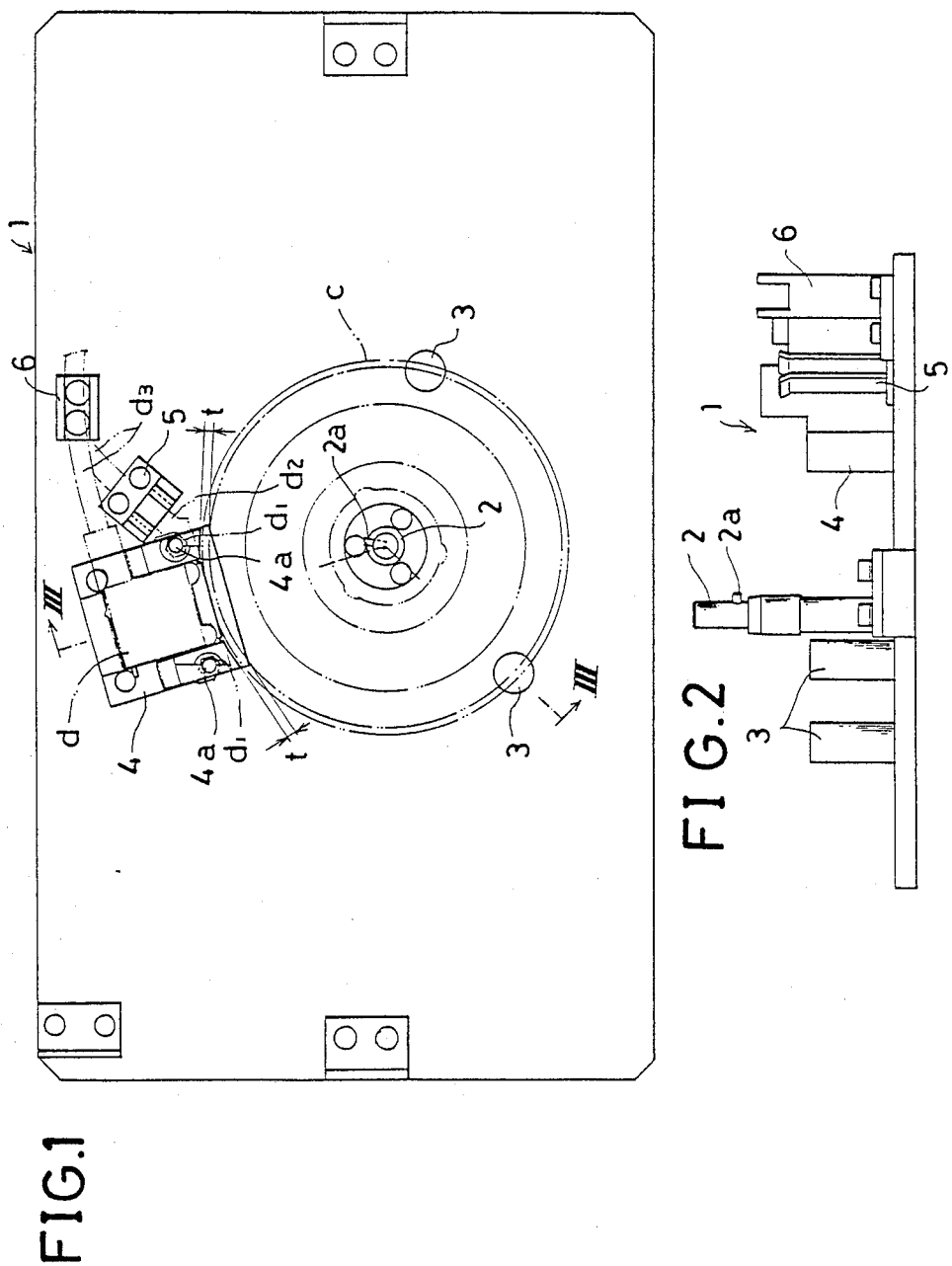
FIG. 1 is a top plan view of one example of a set jig used for carrying out a process of this invention.
FIG. 2 is a right side view thereof.
Figure 3:
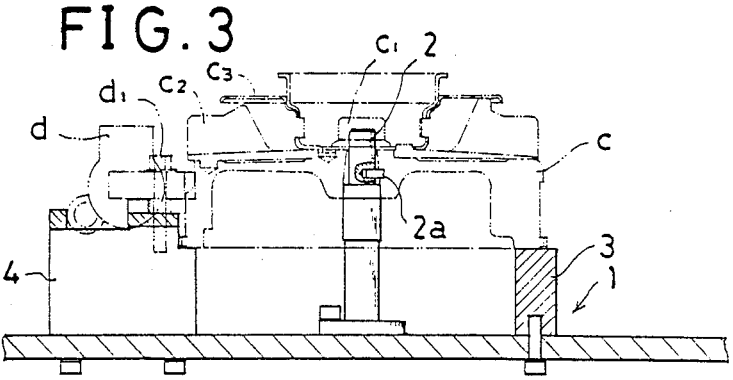
FIG. 3 is a sectional view taken along the line III—III in FIG. 1.

FIGS. 1-3 show a set jig 1 provided at its upper surface with a center pole 2 for fitting into a center opening of the fly wheel c. A pair of wheel receiving members 3, 3 support the fly wheel c. A coil receiving member 4 supports the ignition coil d. Holding members 5, 6 hold a cord clamper d2 and a coil cord d3 from dangling. The center pole 2 is provided with a pin 2a projecting therefrom. The pin 2a engages with a key groove made in the center opening of the fly wheel c so that the fly wheel c is mounted, in its predetermined phase relationship, on the pole 2 when the fan c2 and the starter pulley c3 are placed one upon another. The nut c1 is set on a top portion of the pole 2. Additionally, the coil receiving member 4 is provided with a pair of bolt insertion openings 4a, 4a. The pair of bolts d1, d1 are inserted through the ignition coil d, with one of the two being inserted through the cord clamper d2. The coil d is set on the coil receiving member 4 so that each bolt d1 may be inserted into each insertion opening 4a. The center pole 2 and the coil receiving member 4 are disposed so that the fly wheel c and the ignition coil d have a comparatively large space t (5 mm for instance,) therebetween. The space t causes the two not to be mutually attracted to each other by a magnetic force.

A workpiece setting operation on the set jig 1 is carried out at a predetermined set station. The set jig 1 is then conveyed by a conveyer to a predetermined delivering position and is stopped at that position. The fly wheel c and the ignition coil d are then delivered to an assembling jig 7. The fly wheel c and the ignition coil d are assembled by the assembling jig 7 to an engine which is placed at a predetermined assembling position in such a posture that a crankshaft b thereof is oriented in a vertical direction.

Figure 6:
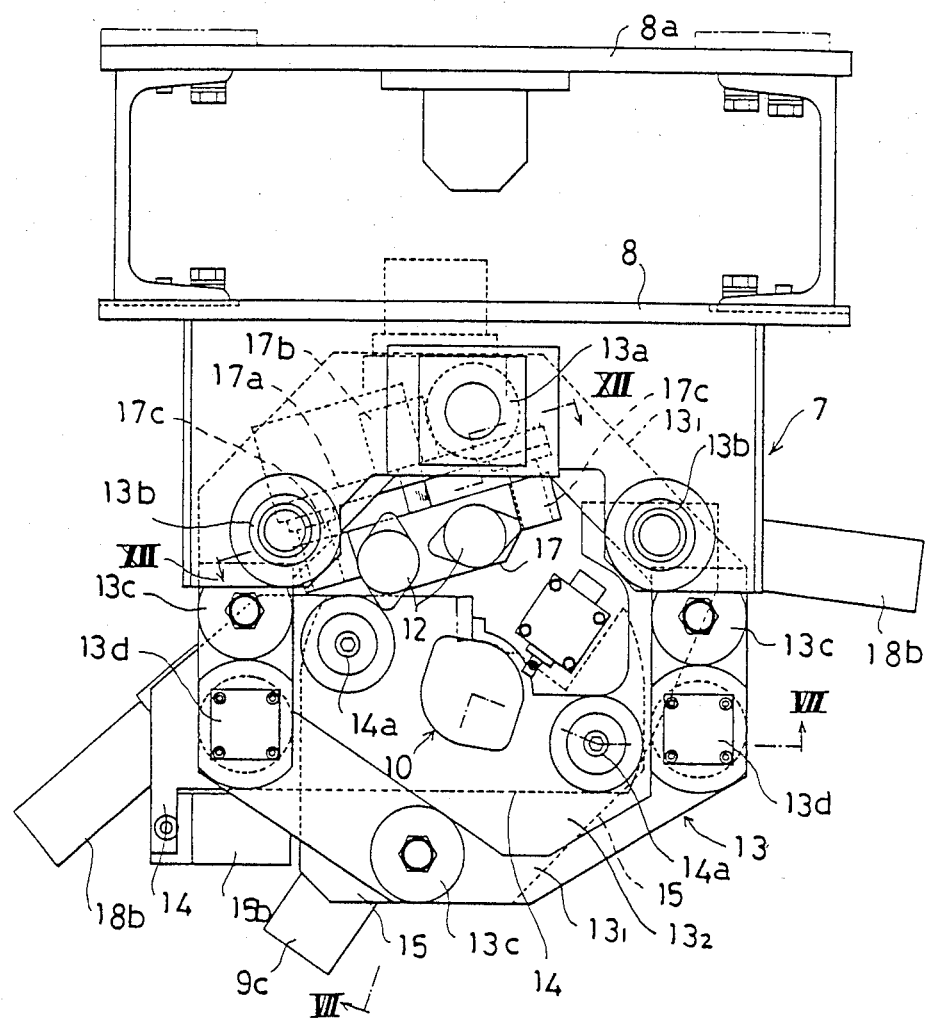
FIGS. 5 and 6 are a front view and a top plan view thereof, respectively.
Figure 4:
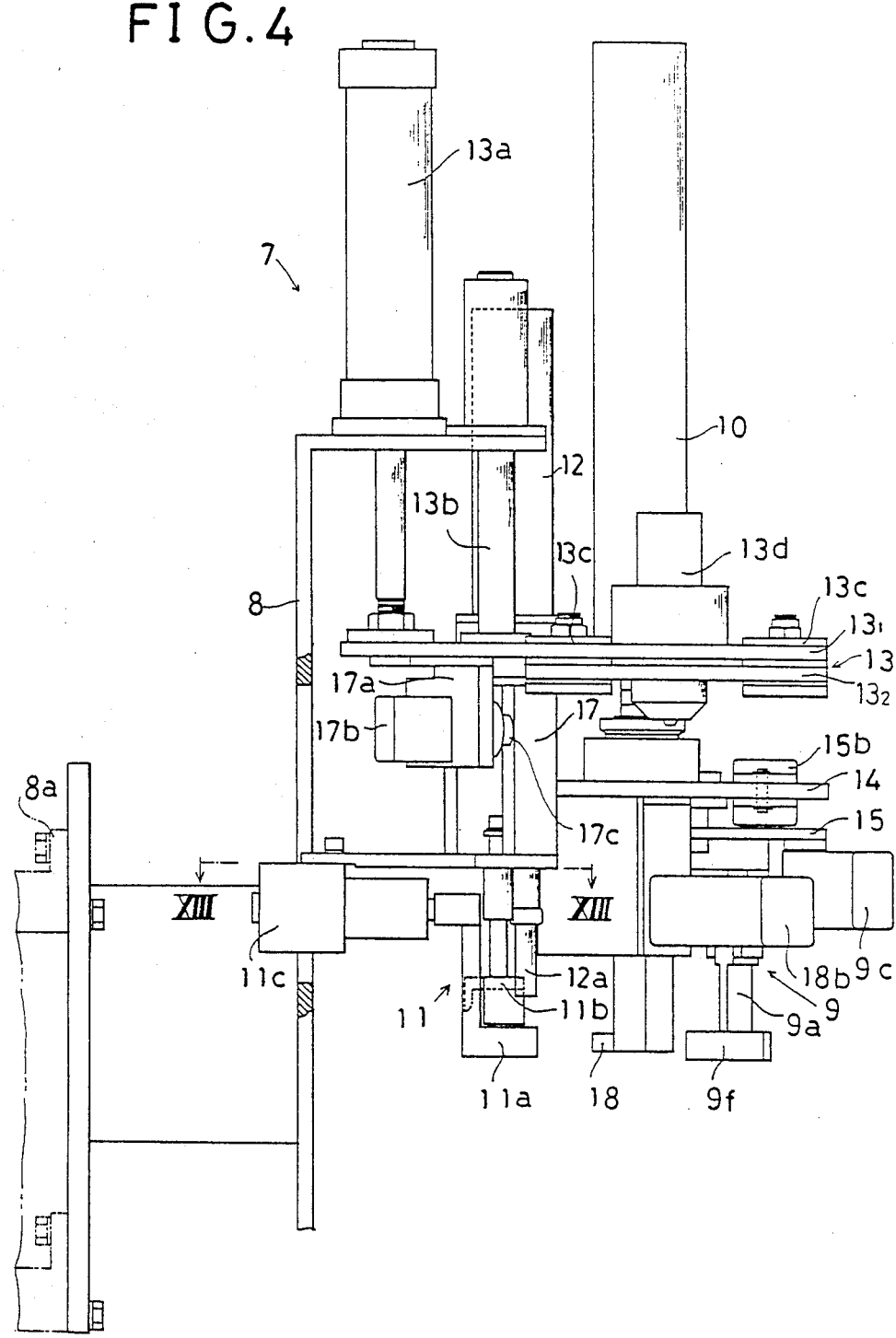
FIG. 4 is a side view of one example of an assembling jig used for carrying out a process of this invention.
Figure 5:
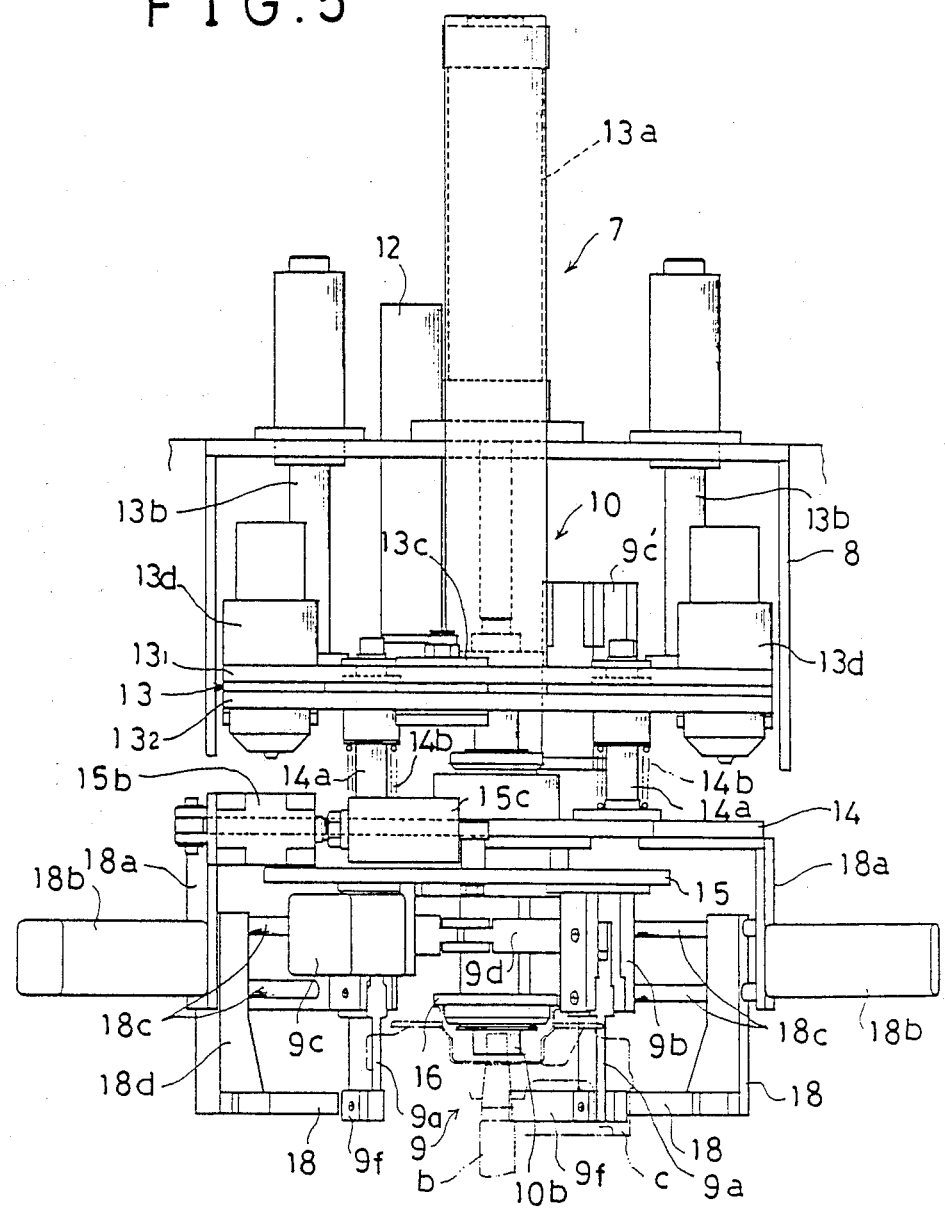

The assembling jig 7 is constructed as shown in FIGS. 4–6. A jig frame 8 has a rear surface provided with an attaching base 8a which is attached to a moving mechanism such as a robot or the like. The jig frame 8 is provided with a first holding means 9 and a first fastening means 10 for the fly wheel c, and a second holding means 11 and a second fastening means 12 for the ignition coil d.

Figure 7:
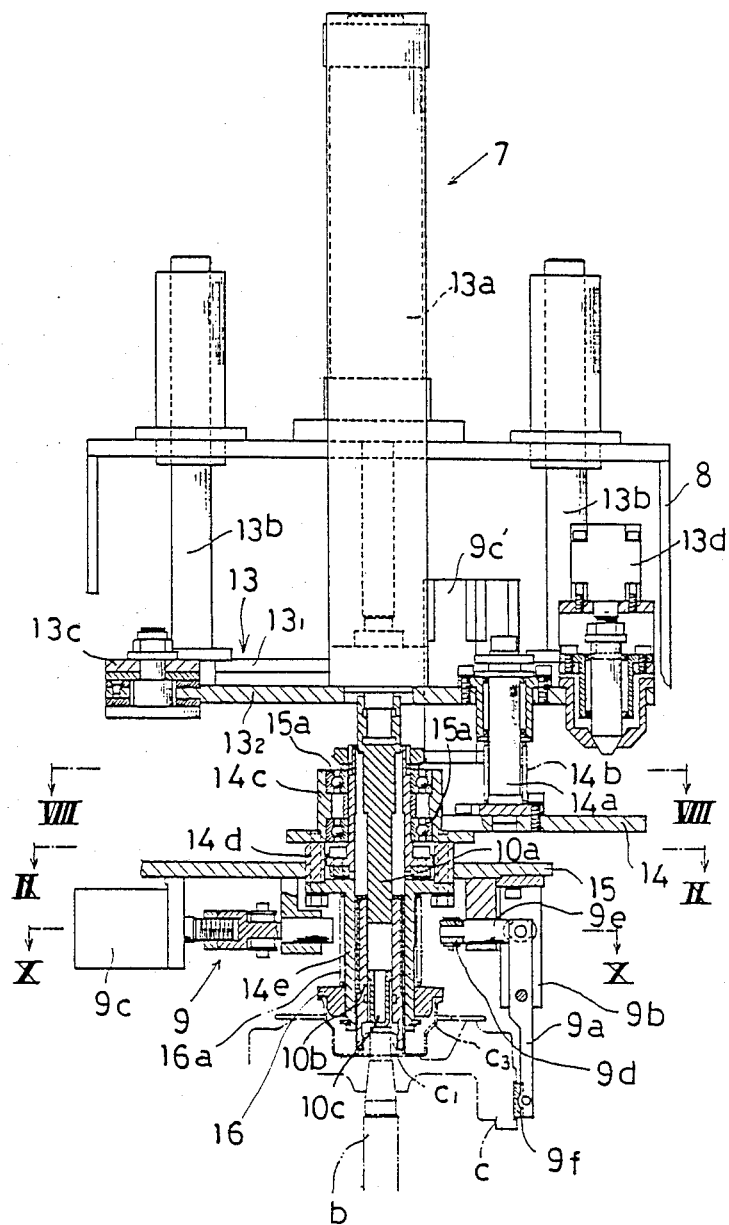
FIG. 7 is a sectional view taken along the line VII—VII in FIG. 6.
Figure 8:
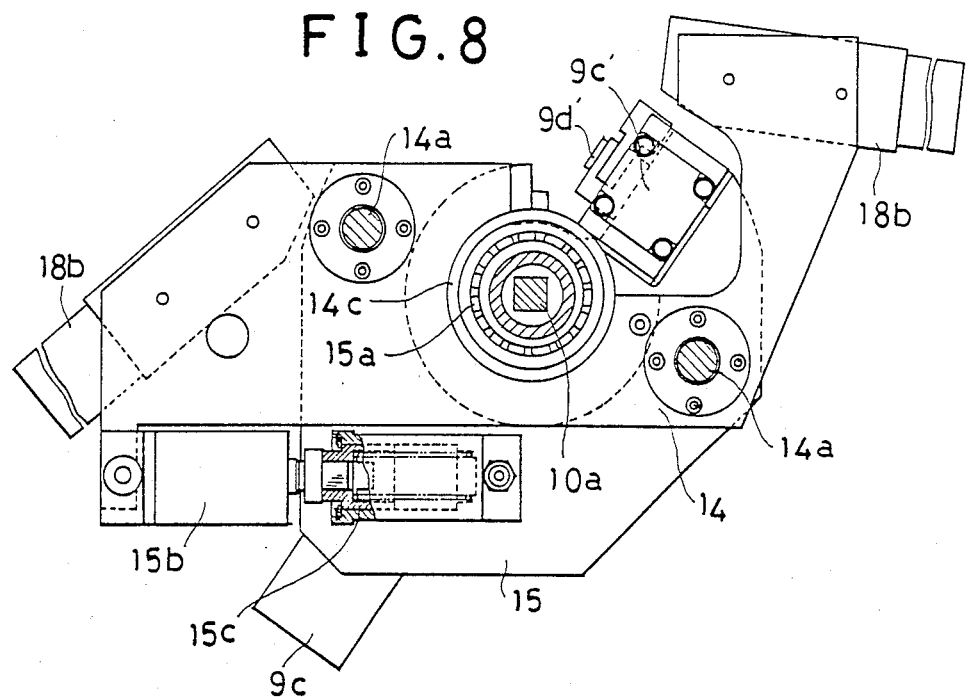
FIGS. 8-10 are sectional views respectively taken along the lines VIII—VIII to X—X in FIG. 7.
Figure 9:
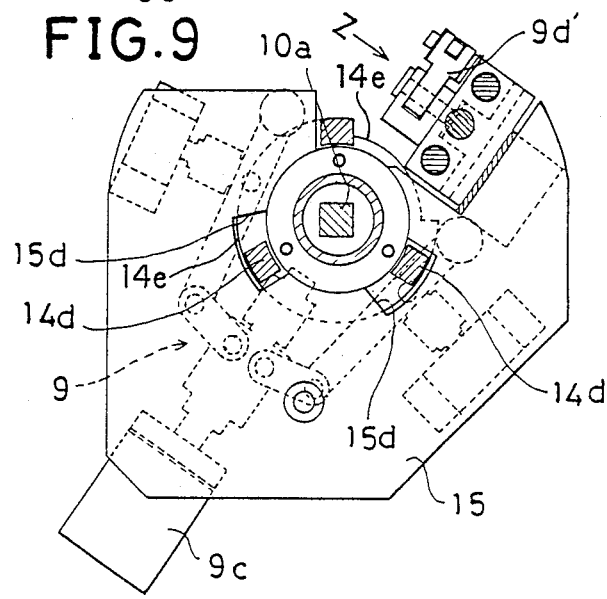

The jig frame 8 is provided with a driving plate 13 which is movable in the axial direction of the crankshaft b, that is, in the vertical direction, by means of a cylinder 13a and a pair of left and right guide bars 13b, 13b. The driving plate 13 comprises an annular upper plate $13_1$ connected to the cylinder 13a, and a lower plate $13_2$ is supported, as shown in FIG. 7, to be freely movable in the horizontal direction in relation to the upper plate $13_1$ by means of three floating members 13c. Floating member 13c holds the lower plate $13_2$ from above and below so as to be movable to slide. The lower plate $13_2$ may be settable in a desired predetermined position by means of a pair of positioning cylinders 13d. The lower plate $13_2$ is provided below with an urging plate 14, as shown in FIG. 7 and FIG. 8. The urging plate 14 is movable upwards against the action of a pair of springs 14b, while being guided by a pair of guide bars 14a. Additionally, the urging plate 14 is provided below with a rotary plate 15, as shown in FIG. 9, through a bearing 15a (FIG. 7) which is coaxial with the axis of the crankshaft b. The plate 15 is arranged to be rotatable through a cushion member 15c (FIG. 5) by a cylinder 15b attached to the urging plate 14.

The first holding means 9 for holding the fly wheel c is attached to a lower surface of the rotary plate 15. The first fastening means 10, comprising a nut runner, is provided upright on the lower plate $13_2$ of the driving plate 13.

Figure 10:
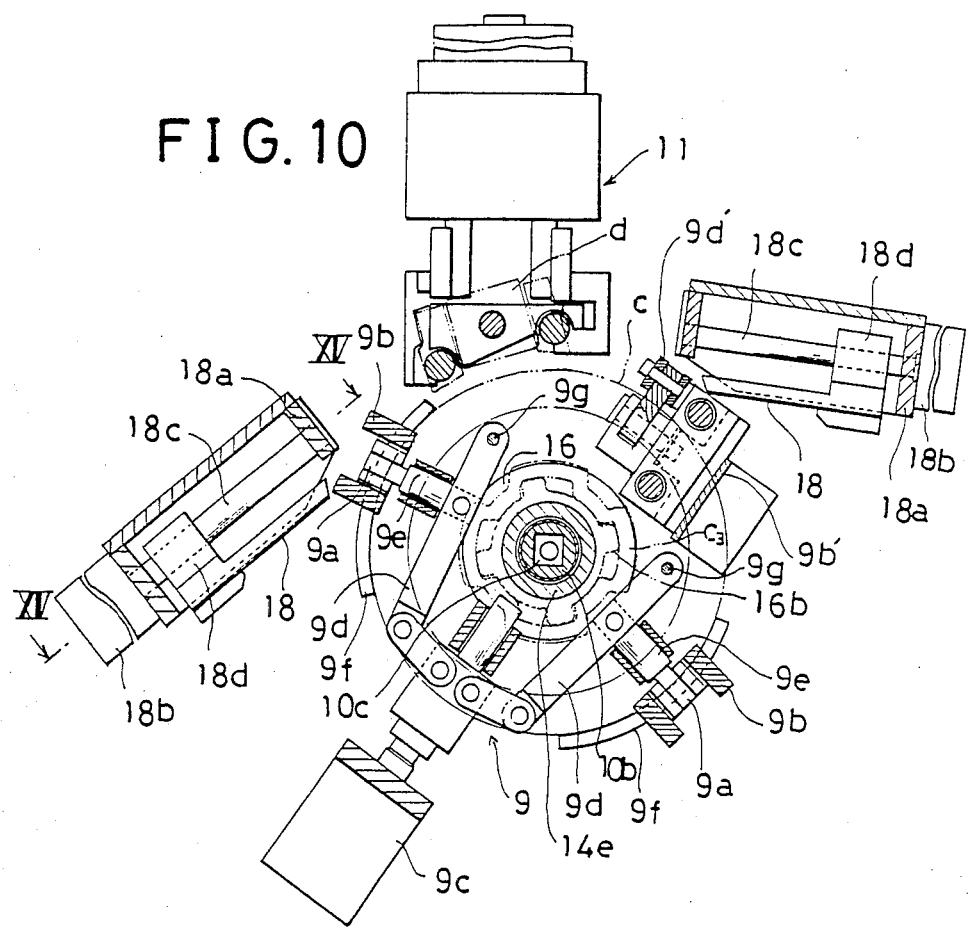
Figure 11:
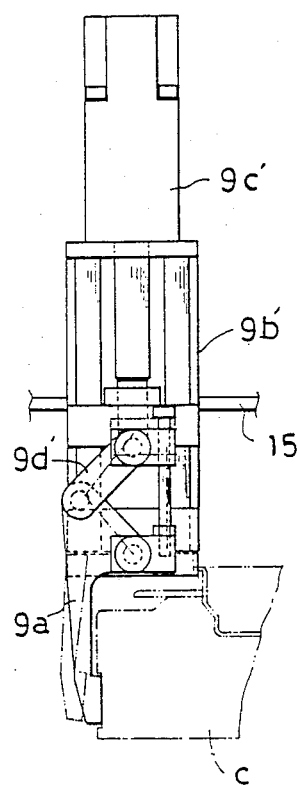
FIG. 11 is a side view of a clamp arm viewed from the direction shown by an arrow Z in FIG. 9.

The first holding means 9 comprises three clamp arms 9a, 9a, 9a for clamping the fly wheel c at three positions on the circumference thereof. Two clamp arms 9a, 9a thereof are arranged, as shown in FIGS. 5, 7, and 10 to be swingably supported at their middle portions on respective brackets 9b. The brackets 9b are attached to a lower surface of the rotary plate 15. The two clamp arms 9a are connected at their upper ends to respective pins 9e. The two clamp arms 9a are movable to advance and retreat in the radial direction about the axis of the crankshaft b, through respective links 9d, by a cylinder 9c attached to a lower surface of the rotary plate 15, so that the respective two clamp arms 9a may be opened and closed by expansion and contraction operations of the cylinder 9c. The remaining one clamp arm 9a is, as shown in FIG. 11, opened and closed through a link 9d' by a cylinder 9c' provided upright on a bracket 9b' fixed to the rotary plate 15.

Thus, the fly wheel c may be held coaxially with the crankshaft b by the closing operation of the three clamp arms 9a, 9a, 9a.

Referring to the drawings, an arc-shaped abutment seat 9f is provided for the fly wheel c on a lower end of each clamp arm 9a. A pivot shaft 9g (FIG. 10) is fixed to the rotary plate 15 and is mounted in a forward end of each line 9d.

As shown in FIGS. 7 and 8, an outer sleeve 14c surrounds a bearing 15a which is fixed to the urging plate 14. The outer sleeve 14c is provided with plural leg members 14d projecting downwards through plural arc-shaped openings 15d (FIG. 9) made in the rotary plate 15. The leg members 14d are provided with a guide sleeve 14e projecting downwards therefrom. A pulley holder 16 is brought into abutment with the starter pulley c3 on the fly wheel c. The pulley holder 16 is in spline engagement with an outer circumference of the sleeve 14e when it is urged downwards by a spring 16a. A socket 10b is mounted slidably on a driving shaft 10a. The socket 10b, which extends downwards from the first fastening means 10, is contained in the sleeve 14e. A guide pin 10c, which is mounted in the nut c1, is slidably provided in the socket 10b.

Additionally, as shown in FIG. 10, the pulley holder 16 is provided with protrusions 16b. The protrusions 16b are mounted in concave portions made in an inner circumference of the starter pulley c3 in order to prevent the fly wheel c from rotating together with the nut c1 when the nut c1 is fastened.

Figure 12:
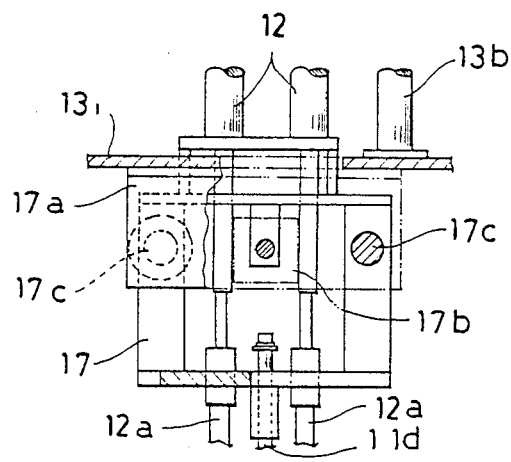
FIG. 12 is a sectional view taken along the line XII—XII in FIG. 6.

As shown in FIGS. 4, 6, and 12, a movable frame 17 is movable to advance and retreat in the radial direction with the axis of the crankshaft b as a center. The frame 17 is moved by means of both a cylinder 17b and a pair of guide bars 17c, 17c. The frame 17 is supported on a bracket 17a which extends downwards from a lower surface of the upper plate $13_1$ of the driving plate 13. The second holding means 11, for holding the ignition coil d, is attached to a lower portion of the movable frame 17. A pair of the second fastening means 12, 12 each comprising a nut runner, are provided upright on an upper portion of the movable frame 17.

Figure 13:
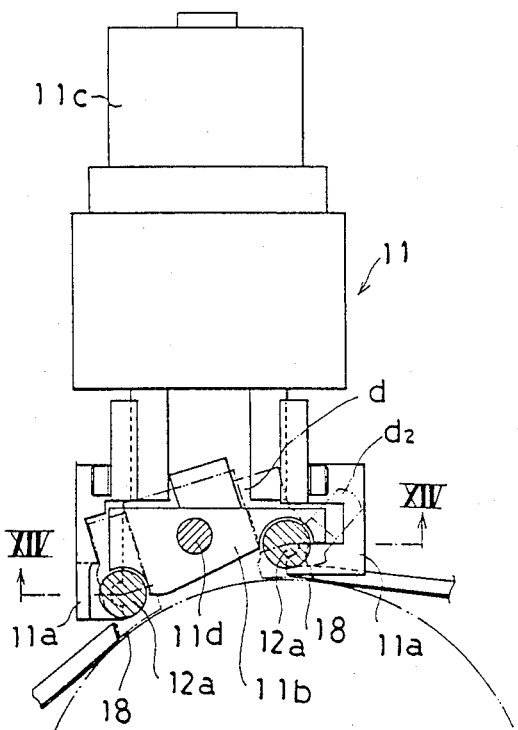
FIG. 13 is an enlarged sectional view taken along the line XIII—XIII in FIG. 4.
Figure 14:
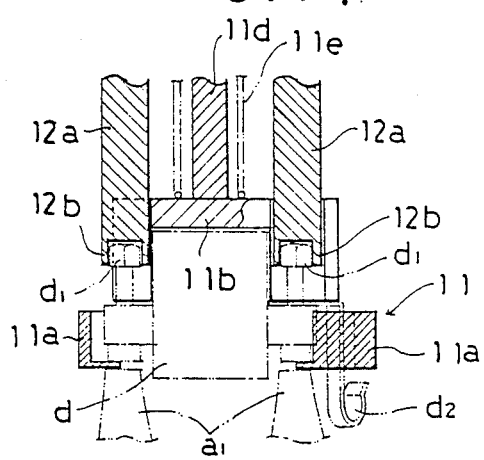
FIG. 14 is a sectional view taken along the line XIV—XIV in FIG. 13.

The second holding means 11 comprises, as shown in FIGS. 13 and 14, a pair of supporting claws 11a, 11a for supporting the ignition coil d at lower surfaces of yokes on both sides of the ignition coil d. A coil holder 11b positions the ignition coil d to cover the same from above. The two supporting claws 11a, 11a are arranged to be opened and closed by an opening and closing actuator 11c. The coil holder 11b is arranged to be movable upwards and downwards by a guide pin 11d. The coil holder 11b is urged downwards by a spring 11e so that, by a closing operating of the two supporting claws 11a, 11a, the ignition coil d may be held between the two supporting claws 11a, 11a and the coil holder 11b. A socket 12b is attached to a lower end of each driving shaft 12a of the second fastening means 12. The socket 12b is to be mounted on each bolt d1 previously inserted through the yoke on each side of the coil d.

Additionally, as shown in FIG. 10, there are provided on a lower surface of the urging plate 14, a pair of shims 18, 18. The pair of shims 18, 18 are movable to advance and to retreat in the tangential directions of the fly wheel c and towards respective spaces formed between the yokes on both sides of the ignition coil d and the fly wheel c.

Figure 15:
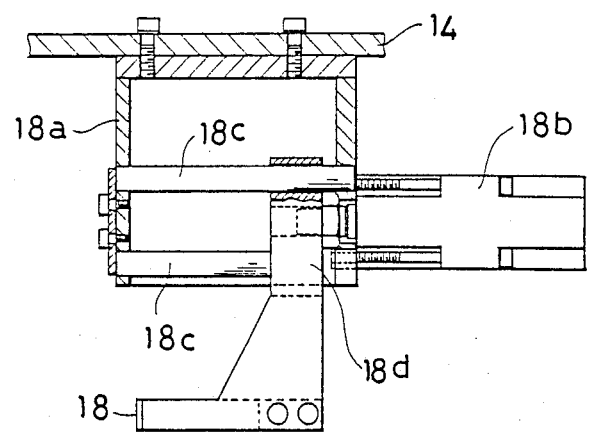
FIG. 15 is a sectional view taken along the line XV—XV in FIG. 10.

A pair of brackets 18a, 18a are provided vertically downwards on the urging plate 14 to be located on both sides of the second holding means 11. As shown in FIG. 15, the bracket 18a on each side is provided with a slide frame 18d which is movable to advance and to retreat in the tangential direction by a cylinder 18b and a pair of guide bars 18c, 18c. The shim 18 has a thickness equal to the normal space between each yoke and the fly wheel c. The shim 18 is attached to a lower end of the slide frame 18d.

For carrying out an assembling operation by the apparatus of the foregoing described embodiment, firstly the assembling jig 7 is moved, by operation of the moving mechanism, to a delivering position, at which the set jig 1 is fixedly placed in position. Then, the driving plate 13 is lowered.

The pulley holder 16 and the coil holder 11b, of the second holding means 11, are seated on the starter pulley c3 and the ignition coil d. At the same time, the guide pin 10c is inserted into the nut c1.

If the clamp arms 9a, 9a, 9a of the first holding means 9, and the supporting claws 11a, 11a of the second holding means 11 are closed, the fly wheel c is held by the first holding means 9 when the fan c2, the starter pulley c3 and the nut c1 are positioned one upon another in a single layer. The ignition coil d is held by the second sliding means 11 when the bolts d1, d1 and the cord clamper d2 are mounted thereon.

In this case, the second holding means 11 is kept in its outwardly retreated position in the radial direction by movement of the movable frame 17, in order that the fly wheel c and the ignition coil d may be held by the two holding means 9, 11, with a comparatively large space left therebetween. The space is substantially equal to that obtained when the two are set on the set jig 1.

The driving plate 13 is then elevated. The fly wheel c and the ignition coil d are lifted upwards from the set jig 1. Thereafter, the assembling jig 7 is moved to an assembling position where the engine is placed in position. The driving plate 13 is then lowered.

The end portion of the crankshaft by is inserted into the center opening of the fly wheel c. If, in this case, the key groove of the center opening and the key attached to the crankshaft b are not brought into alignment with one another, the lowering movement of the fly wheel c is hindered by the key and the urging plate 14b is moved upwards against the action of the spring 14b toward the driving plate 13. Accordingly, this upward movement is detected by a detecting means. The cylinder 15b is operated, and the rotary plate 15 is turned so that the fly wheel c, held by the first holding means 9 attached thereto, is turned. If, in this case, the key groove is brought into alignment with the key, the fly wheel c is pushed down towards the crankshaft b, through the urging plate 14 and the rotary plate 15, by the urging force of the spring 14b. Accordingly the key is inserted into the key groove and the end portion of the crankshaft b is mounted accurately in the center opening of the fly wheel c. Thereafter, by operation of the first fastening means 10, the nut c1 is fastened, and the fly wheel c, the fan c2 and the starter pulley c3 are fastened together to the crankshaft b.

When the fly wheel c is transferred from the set jig 1 to the first holding means 9 or when it is assembled to the crankshaft b from the first holding means 9, the lower plate $13_2$ of the driving plate 13 is released from its restricted position by the positioning cylinder 13d. Thus, by movement of the lower plate $13_2$ in the horizontal direction, any axial displacement of the flywheel c or of the crankshaft b can be absorbed.

The pair of shims 18, 18 are then advanced from outside in the tangential directions to circumferential surface portions that face the yokes on both sides of the ignition coil d. Under this condition, the second holding means 11 is advanced from its retreated position towards the fly wheel c by movement of the movable frame 17. The yokes on both sides of the ignition coil d are then brought into abutment with the circumferential surface of the fly wheel c through each shim 18, so that the ignition coil d is allowed to approach a normal facing position in relation to the fly wheel c. If, then, each of the second fastening means 12, 12 is operated, each bolt d1 is brought into threaded engagement with the boss portion a1 of the engine main body a. The ignition coil d is fastened to the engine main body a together with the cord clamper d2.

Thus, according to this invention, the fly wheel and the ignition coil are set on the set jig to leave a comparatively large space therebetween so that they do not influenced one another by a magnetic force. The fly wheel and the coil are delivered to the assembling jig, with the space maintained. After the wheel is assembled to the crankshaft, the coil is brought close to the fly wheel and is assembled to the engine main body so as to be located at its regular facing position in relation to the fly wheel. The setting operation of the wheel and the coil onto the set jig can be carried out easily, without causing the two to be magnetically adhered together. The fly wheel can be assembled after being aligned in phase in relation to the crankshaft, without being obstructed by the magnetic force acting between the fly wheel and the ignition coil. Thus, the assembling of the fly wheel and the ignition coil can be carried out, without any problem, by using the single set jig and the single assembling jig. Thus, the installation costs can be lowered and the working efficiency can be improved.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What we claim is:

1. A process for assembling a fly wheel and an ignition coil to an engine, said engine having said fly wheel assembled to an end portion of a crankshaft of said engine, said engine having said ignition coil assembled to an engine main body to face a circumferential surface of said fly wheel, said fly wheel having a magnet, said process comprising:
   setting said fly wheel and said ignition coil on a set jig;
   leaving a comparatively large space between said fly wheel and said ignition coil so that the two are not influenced by a magnetic force between the magnet and the ignition coil;
   moving said set jig to a delivery position;
   moving an assembling jig having two holding means for holding said fly wheel and for holding said ignition coil to said delivery position;
   moving said fly wheel and said ignition coil, placed on said set jig, to said holding means;
   maintaining the space between said fly wheel and said ignition coil while moving said fly wheel and said ignition coil to said two holding means;
   moving said assembling jig to an assembling position where said engine is placed in position;

assembling said fly wheel to said end portion of said crankshaft;
bringing said ignition coil to approach said fly wheel; and
assembling said ignition coil to said engine main body to be located at its normal facing position in relation to said fly wheel.

* * * * *